May 8, 1956    J. M. HAIT    2,744,613
FRUIT TRANSFERRING AND REJECTING MEANS
Filed Oct. 29, 1951    7 Sheets-Sheet 1
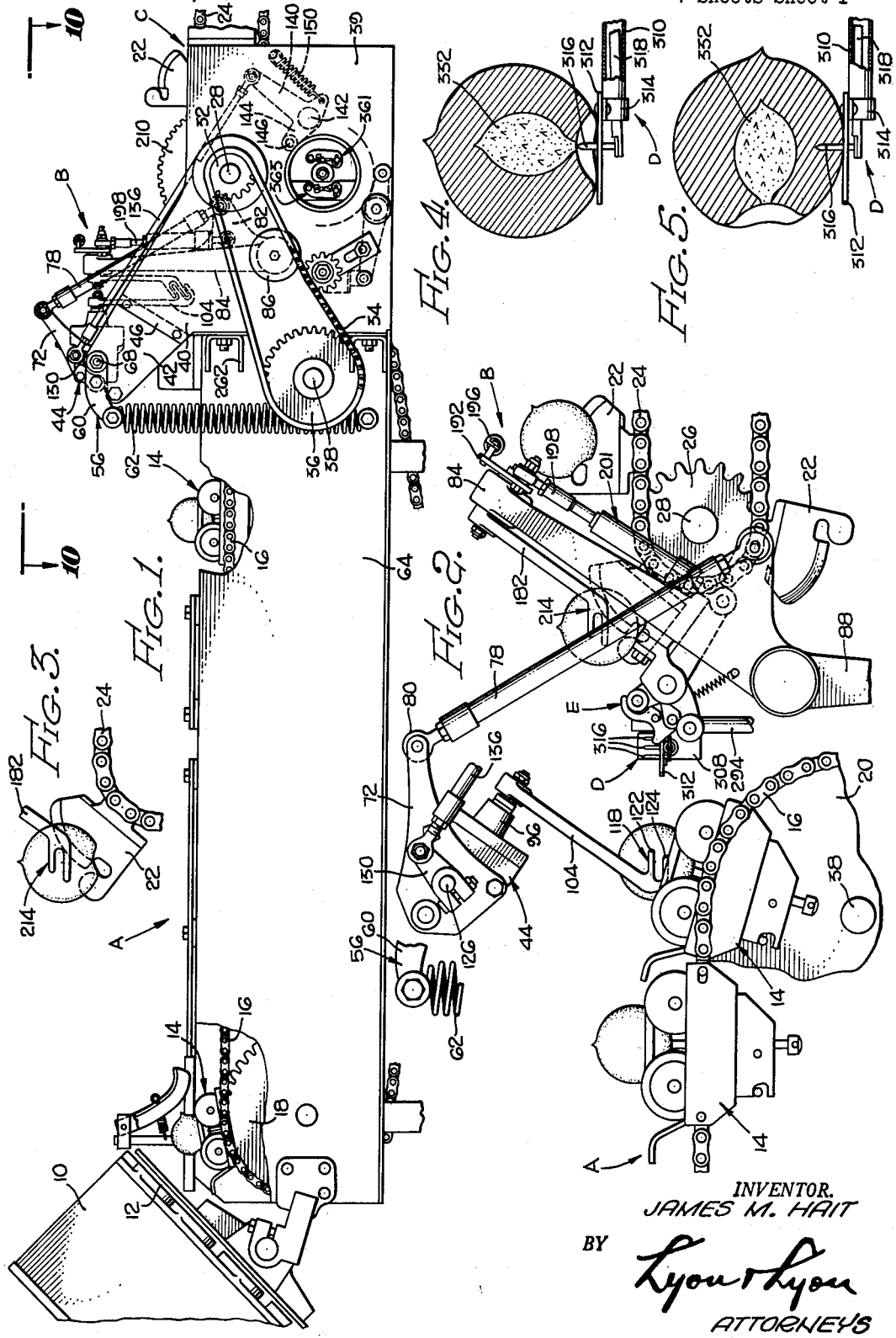
INVENTOR.
JAMES M. HAIT
BY
Lyon & Lyon
ATTORNEYS

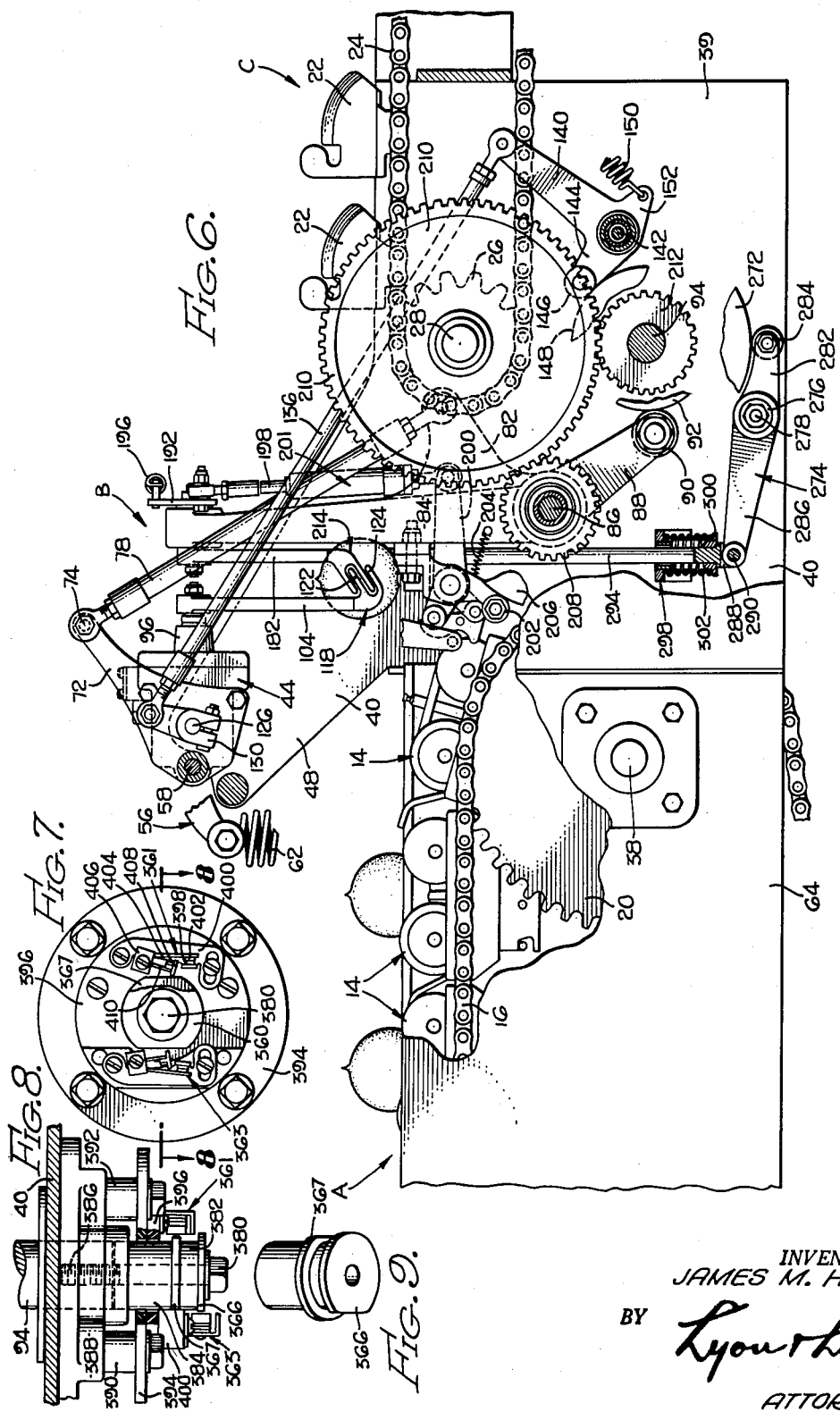

May 8, 1956 J. M. HAIT 2,744,613
FRUIT TRANSFERRING AND REJECTING MEANS
Filed Oct. 29, 1951 7 Sheets-Sheet 3

INVENTOR.
JAMES M. HAIT
BY
Lyon & Lyon
ATTORNEYS

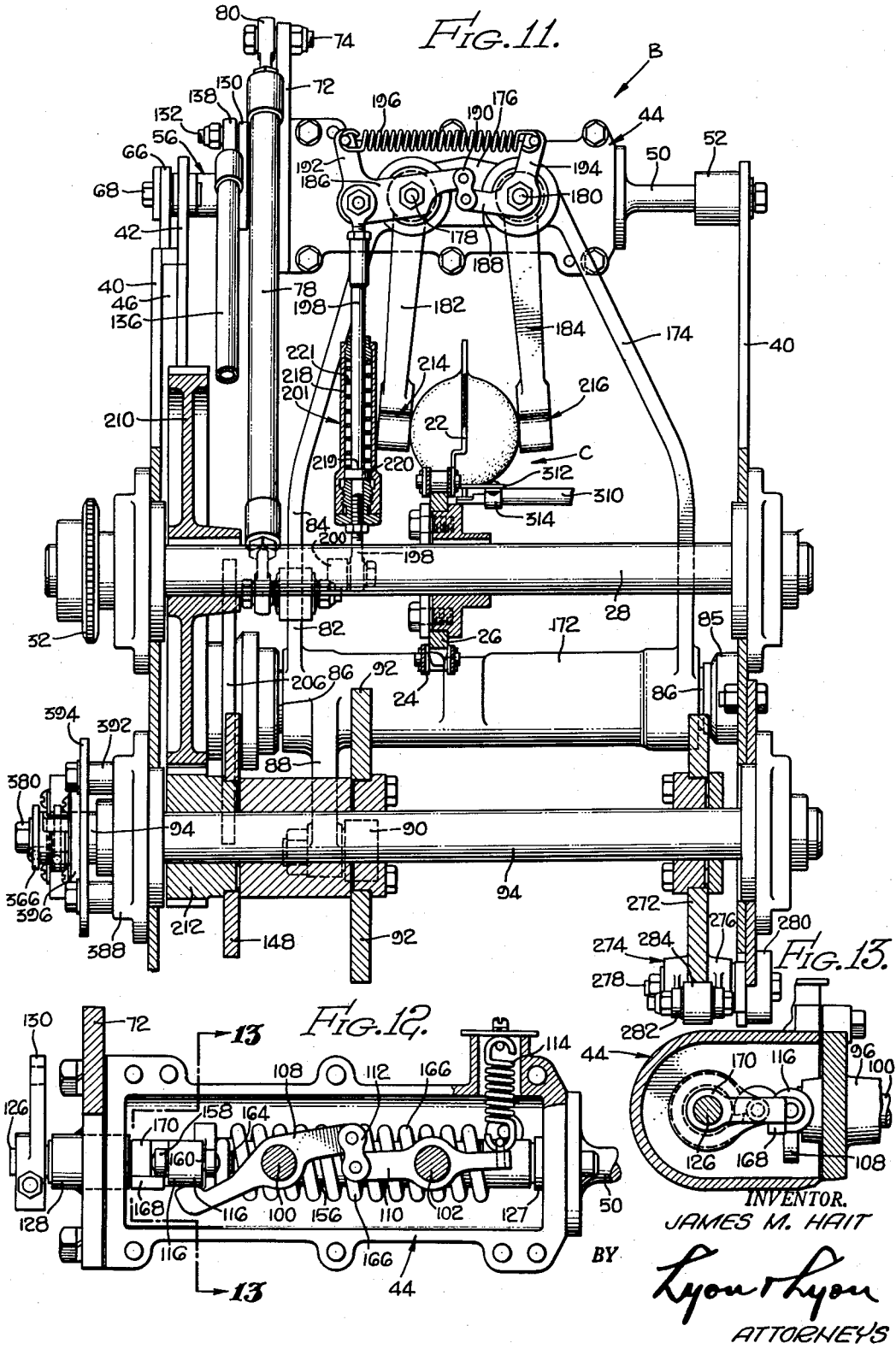

May 8, 1956  J. M. HAIT  2,744,613
FRUIT TRANSFERRING AND REJECTING MEANS
Filed Oct. 29, 1951  7 Sheets-Sheet 5

INVENTOR.
JAMES M. HAIT
BY
Lyon & Lyon
ATTORNEYS

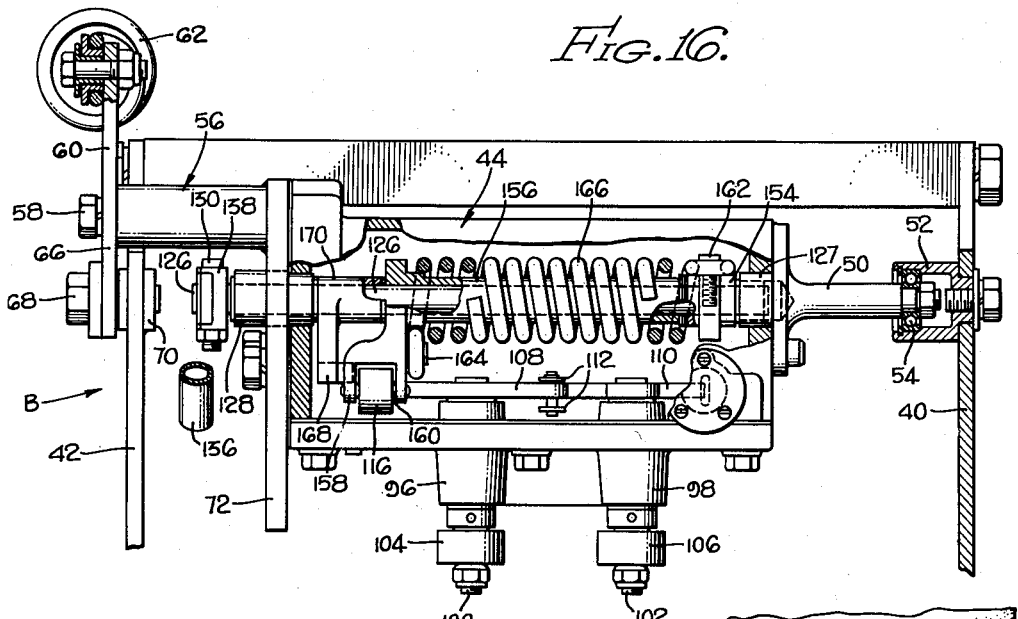
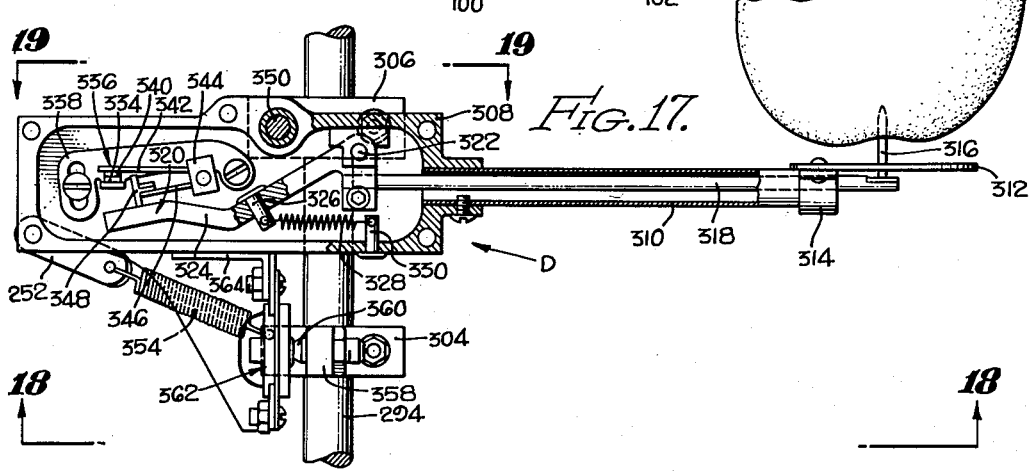
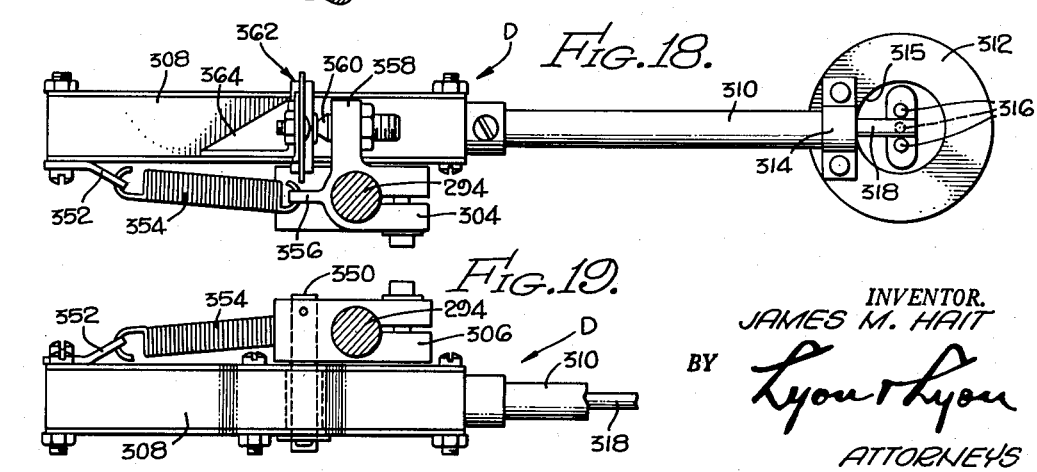

May 8, 1956     J. M. HAIT     2,744,613
FRUIT TRANSFERRING AND REJECTING MEANS
Filed Oct. 29, 1951     7 Sheets-Sheet 7
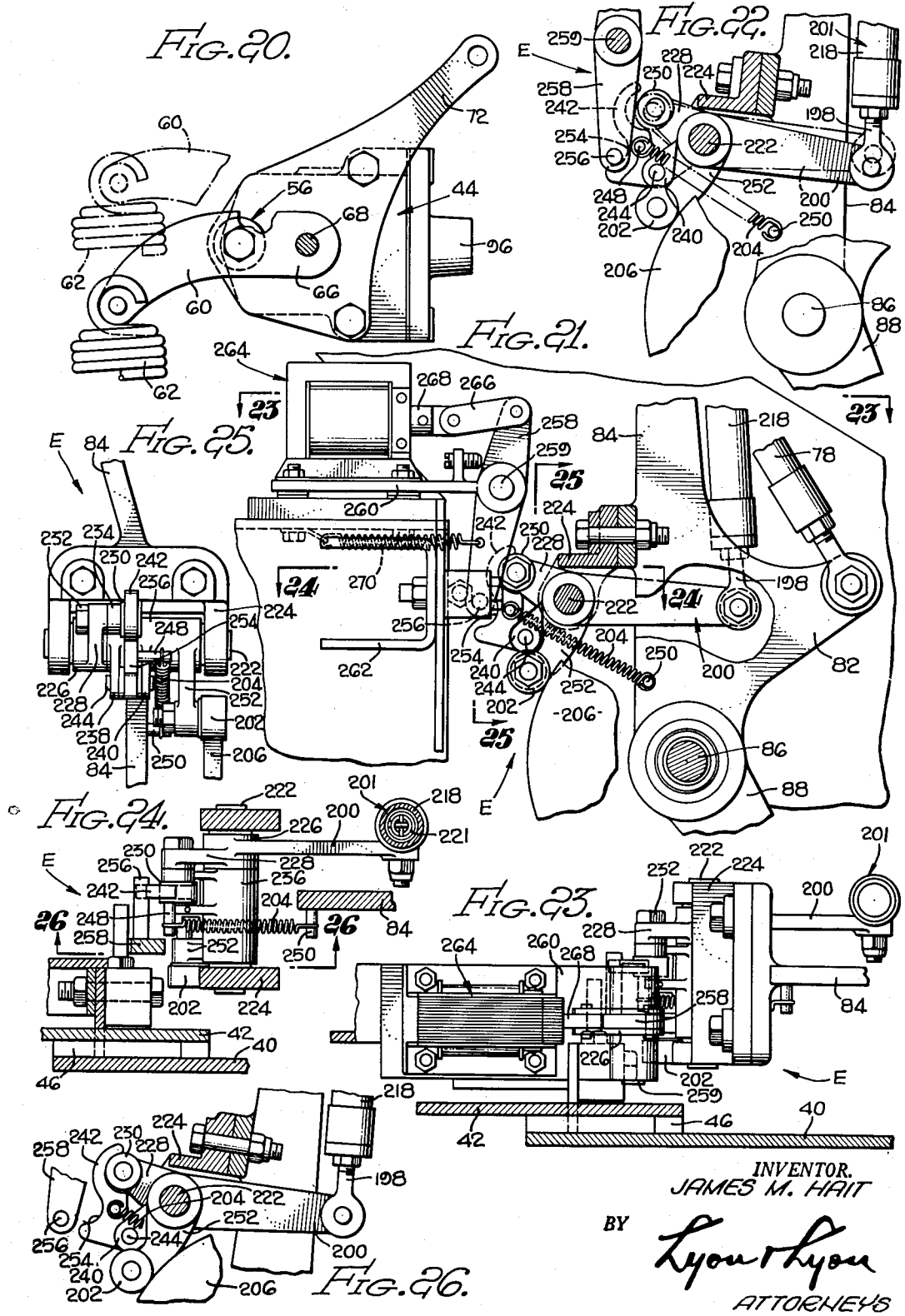
INVENTOR.
JAMES M. HAIT
BY
Lyon & Lyon
ATTORNEYS United States Patent Office 2,744,613
Patented May 8, 1956

2,744,613

FRUIT TRANSFERRING AND REJECTING MEANS

James M. Hait, San Jose, Calif., assignor, by mesne assignments, to Food Machinery and Chemical Corporation, San Jose, Calif., a corporation of Delaware Application October 29, 1951, Serial No. 253,627

14 Claims. (Cl. 198—33)

This invention relates to means for transferring indented fruit from an orienting machine to a processing machine and means for rejecting improperly aligned indented fruit.

In referring to indented fruit I refer to fruit such as peaches, apricots and other similar or like fruit which have a stem or calyx indent, which indent has major and minor diameters and wherein the major diameter lies in a plane which serves as a reference plane for aligning fruit with respect to the processing machine.

The mechanism hereinafter described is particularly adapted to the orientation and processing of peaches. However, the invention is not limited to machines for processing this particular type of fruit.

For many years processing machines adapted to halve and pit peaches and similar fruit have required hand feeding of the fruit because of the necessity that the fruit be fed to the processing machine in a particular position or with reference to a particular plane of the fruit to obtain satisfactory processing. Recently various mechanisms have been developed for mechanically aligning fruit to the position required for feeding to the processing machine. These orienting mechanisms for one reason or another do not properly align all of the fruit and a sizable percentage thereof is delivered to the processing machine in a misaligned or unoriented state.

It is an object of this invention to provide means for mechanically transferring fruit from a fruit orienting mechanism to a fruit processing or pitting mechanism.

It is a further object of this invention to provide means for ascertaining when a fruit is properly aligned for transfer from the fruit orienting mechanism to the fruit processing mechanism.

Still a further object of this invention is to provide means for interrupting the transfer of the fruit when fruit is indicated as misaligned.

Other objects and advantages of this invention will be apparent from the following description.

In the drawings:

Figure 1 is a side elevation of a fruit orienting mechanism with a transfer means embodying this invention mounted thereon.

Figure 2 is a partial side elevation of the fruit transfer means.

Figure 3 is a fragmentary side elevation of the delivery of a peach to the fruit processing machine.

Figure 4 is a side elevation in section of the fruit inspecting means indicating a properly aligned peach.

Figure 5 is a side elevation in section of the fruit inspecting means indicating a misaligned peach.

Figure 6 is a fragmentary side elevation illustrating the fruit transferring means holding a peach in the inspecting position.

Figure 7 is an end view of the disabling means actuating switches.

Figure 8 is a plan view, partially in section, taken along the line 8—8 of Figure 7.

Figure 9 is a perspective view of the control cams for the actuating switches.

Figure 11 is a side elevation taken along the line 11—11 of Figure 10.

Figure 12 is a side elevation taken along the line 12—12 of Figure 10.

Figure 13 is a section taken along the line 13—13 of Figure 12.

Figure 16 is a top plan view, partially in section, with some parts broken away, taken along the line 16—16 of Figure 14.

Figure 17 is a section taken along the line 17—17 of Figure 10.

Figure 18 is a bottom plan view taken along the line 18—18 of Figure 17.

Figure 19 is a top plan view taken along the line 19—19 of Figure 17.

Figure 20 is a partial end view taken along the line 20—20 of Figure 14.

Figure 21 is a section taken along the line 21—21 of Figure 14.

Figure 22 is a partial end view indicating the disabling of the transfer means.

Figure 23 is a top plan view, partially in section, taken along the line 23—23 of Figure 21.

Figure 24 is a section taken along the line 24—24 of Figure 21.

Figure 25 is a partial side elevation taken along the line 25—25 of Figure 21.

Figure 26 is a section taken along the line 26—26 of Figure 24.

Figure 10:
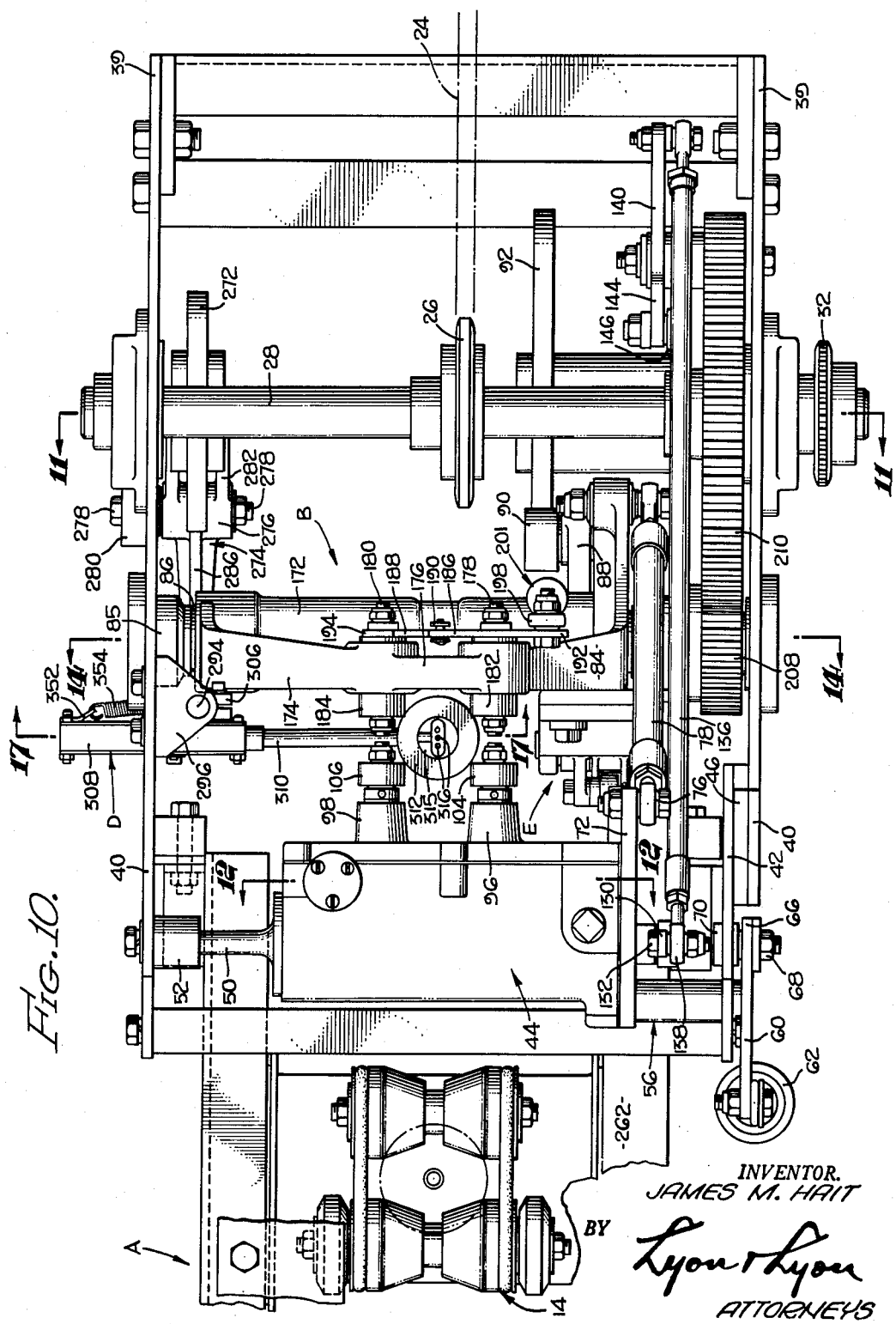
Figure 10 is a plan view of the fruit transferring means taken along the line 10—10 of Figure 1.

Referring now to Figure 1, a fruit orienting machine is generally designated A. The fruit orienting machine A delivers fruit to the transfer means, generally designated B. The transfer mechanism B functions to lift the fruit from the fruit orienting mechanisms and deliver it to a fruit processing or pitting machine generally designated C. This processing or pitting machine may be of any suitable form, one form of which is illustrated in the patent granted to Albert R. Thompson, No. 2,376,526 dated May 22, 1945, for a Continuous Peach Pitter.

The fruit transfer means B is divided into two stages. The first stage delivers the fruit to the second stage. The second stage of the transfer means B carries the fruit from the first stage to the impaling blades of the processing machine C. At the position between the fruit orienting machine A and the fruit processing machine C at which the fruit is shifted from the first stage transfer means to the second stage transfer means, the fruit inspecting device generally designated D (see Figure 14) probes the fruit to determine if it is properly aligned for transfer to the fruit processing machine. In the event that the fruit is improperly aligned, the fruit inspecting device D actuates the disabling means E (see Figures 21 to 26) causing the second stage of the transfer means B to release its hold on the fruit, dropping the fruit into a suitable receptacle, not shown.

Referring now to Figure 1, indented fruit such as peaches is fed into hopper 10, through which it passes through opening 12 onto a fruit orienting mechanism generally designated 14. The fruit orienting mechanism may be of any suitable type, such as that disclosed in my copending application Serial No. 119,069, filed October 1, 1949. A number of these fruit orienting mechanisms 14 are spaced at intervals along the machine and are carried between a pair of spaced endless chains such as 16, which chain 16 passes over sprockets 18 and 20, the sprocket 20 being driven in a manner hereinafter to be described, causing the endless chain to rotate, the other endless chain being driven by a sprocket corresponding to sprocket 20, carrying the fruit orienting mechanism from the hopper 10 to the transfer means. When one of the fruit orienting mechanisms 14 reaches a point at which it is about to travel around the sprocket 20, the fruit is lifted therefrom by the first stage of the fruit transfer means B and delivered to the second stage of the fruit transfer means by which the fruit is delivered to one of the impaling blades 22. A plurality of the impaling blades 22 is mounted at spaced intervals along an endless chain 24, the chain 24 being looped about a sprocket 26 adjacent the fruit processing machine and the other end of the chain being looped about a similar sprocket, not shown. The sprocket 26 is rigidly mounted upon a shaft 28 so that rotation imparted to it by endless chain 24, which is driven by means not shown, rotates shaft 28. Also mounted on the shaft 28 is a second sprocket 32 about which chain 34 passes, the chain 34 also passing about a sprocket 36 which is mounted upon shaft 38 of the fruit orienting machine A. The shaft 38 is the shaft upon which the sprocket 20 and its corresponding sprocket are mounted so that rotation of shaft 28 of the fruit processing machine C rotates the sprocket 20 and its corresponding sprocket for the other endless chain corresponding to 16, thereby driving the endless chains, causing the fruit orienting mechanisms 14 to progress from the hopper 10 to the transfer means B. In this manner the fruit processing machine C and the fruit orienting machine A are driven in timed relation with one another.

As the fruit orienting mechanisms 14 approach the peach processing machine C and at a point whereupon the orienting mechanisms commence to be carried about the sprocket 20, the first stage of the fruit transferring means B removes the fruit from the orienting mechanism, as seen in Figure 2. The construction of the first stage of this fruit transferring means is as follows.

The side plates 39 of the fruit processing machine are spaced from one another and each is provided with an upwardly projecting transfer means supporting section 40, between which the first stage transfer means housing 44 is pivotally mounted (see Figures 1, 3, 6, 14 and 16). It is desirable to stagger one of these side plates (see Figure 14). This is accomplished by providing a block 46 spacing the upper plate 42 from one of the supporting sections 40. It is of course apparent that by varying the size of block 46 the space between the upper plate 42 and the opposed supporting section 40 can be readily varied. Suitably secured to one extremity of the housing 44 is the shaft 50 which, in this embodiment, is flanged at one end and bolted to the housing 44. Suitably mounted at the upper extremity of one of the supporting sections 40 is a bearing housing 52 which contains ball bearing 54 for rotatably mounting the shaft 50. At the opposite extremity of the housing 44 the leg of a T-shaped member 56 is suitably secured such as by bolt 58. One arm 60 of the T-shaped member is suitably secured, such as by bolts, to the spring 62. The opposite extremity of the spring is suitably attached to the frame 64 of the fruit orienting machine as by a bolt, as seen in Figure 1. The other arm 66 of T-shaped member 56 is provided with an aperture adjacent the extremity thereof through which a bolt 68 projects. The extremity of the bolt projects into the bearing 70 which is mounted in the upper section 42 of the supporting section 40, the bolt 68 being rotatably mounted in the bearing 70 as well as secured therein. The bearing 70 is in axial alignment with shaft 50 and thus it is apparent that the housing 44 is pivotally mounted between the spaced supporting sections about shaft 50 and bolt 68. The spring 62 tends to rotate the housing in a counterclockwise direction as seen in Figure 1, for a purpose which hereinafter will be described.

Rigidly connected to housing 44, as by bolts, and positioned between the leg of the T-shaped member 56 and the housing 44 is a crank 72. At the outer extremity of the crank 72 a bolt 74 having a ball 76 attached thereon (see Figure 14) is mounted. An oscillating shaft 78 provided with an extension 80 at one extremity forms a socket adapted to fit over said ball to form a ball and socket joint. Bolt 74 retains the extremity 80 on the ball 76 and the shaft 78 on the crank 72. The oscillator shaft 78 at its opposite extremity is bolted to an arm 82, see Figure 11, of one of the frame members 84 of the second stage of the transfer means. The frame member or crank 84 is pivotally mounted about shaft 86, see Figure 14, which in turn is rotatably mounted on suitable bearings 85 and 87 of the fruit processing machine. A second arm 88, see Figure 11, of frame member or crank 84 carries a cam follower 90 which is adapted to bear against cam 92 which is mounted on shaft 94. The spring 62 tends to rotate the housing 44 through the T-shaped member 56 in a counterclockwise direction, as previously described. This spring action through crank 72, shaft 78, arm 82 and frame member 84 tends to urge the cam follower 90 against the cam 92, thereby insuring a positive contact between the cam and cam follower. The shaft 94 is rotated in a manner and for purposes hereinafter to be described. The rotation of this shaft causes the cam 92 to rotate, which pivots the frame member 84 about shaft 86. This pivoting of the frame member 84 causes the arm 82 to pivot, which exerts an upward or downward force upon the oscillating rod 78, which, through crank 72 rocks the housing 44; the nature and degree of the rocking or rotation of the housing 44 being varied by the configuration of cam 92. The distance from the axes of ball 76 to the axis of the pivotal connection between the rod 78 and the arm 82 is equal to the distance between the center lines of the shaft 86 and the bolt 68. Also the effective length of the crank 72 is equal to the effective length of the arm 82. Thus the crank 72, the rod 78 and the arm 82 form three sides of a parallelogram linkage, best seen in Figure 1, and the arc traversed by the first and second stage transfer means will be of the same length and degree.

Figure 14:
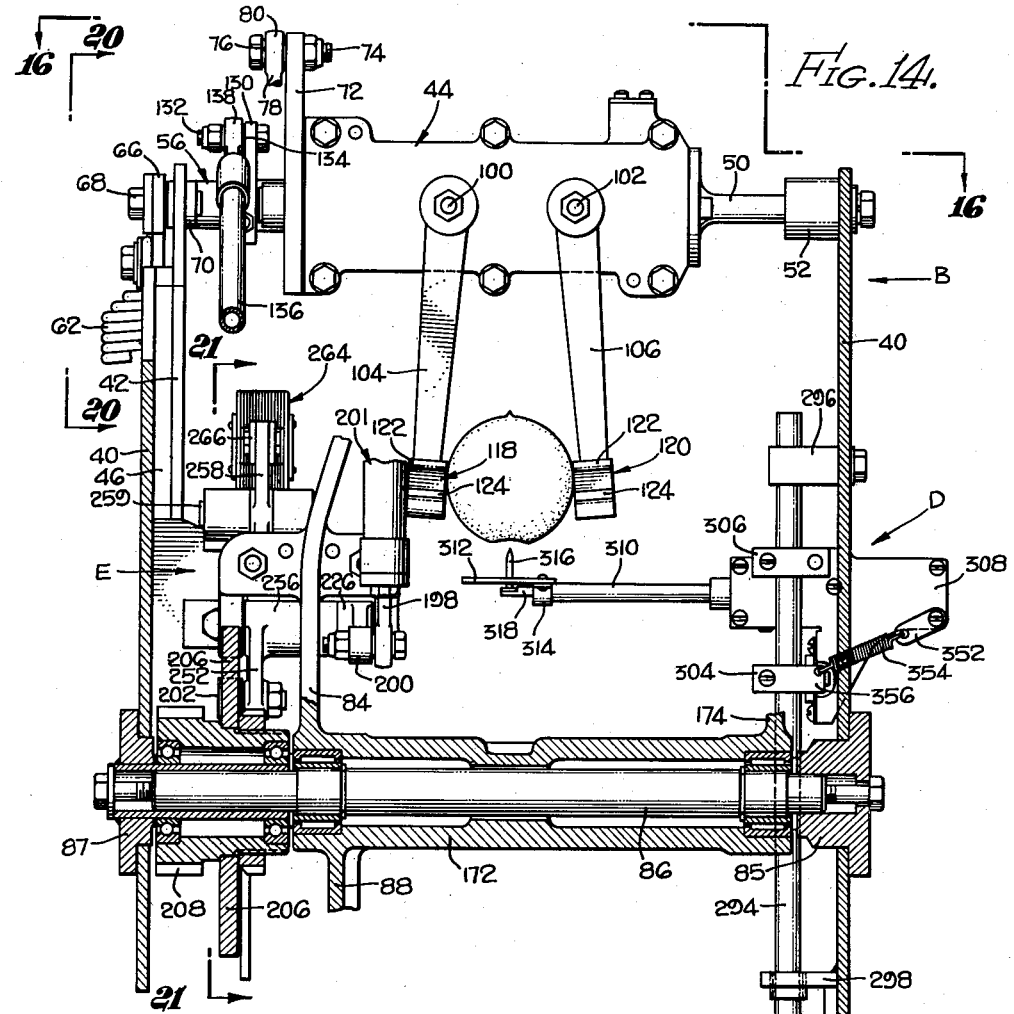
Figure 14 is a section taken along the line 14—14 of Figure 10.

Projecting from the housing 44 are the fruit grasping arm support bearings 96 and 98 which rotatably mount control shafts 100 and 102 respectively. The fruit grasping arms 104 and 106 are suitably secured to shafts 100 and 102, in this embodiment illustrated by suitable nuts. At the opposite extremities of the shafts 100 and 102 from the grasping arms 104 and 106, suitable cranks 108 and 110 are secured. The adjacent extremities of cranks 108 and 110 are joined by a link 112, see Figure 12, and at the opposite extremity of crank 110 spring 114 is secured, said spring also being secured to the housing 44 and functioning to urge rotation of crank 110 in a counterclockwise direction and crank 108 in a clockwise direction. The other extremity of the crank 108 is rounded to form a contact surface and the movement of crank 108 is controlled by the action of roller 116 against which the contact surface is urged by spring 114, which will hereinafter be described in detail. When the crank 108 is urged in a counterclockwise direction by downward movement of roller 116, the crank 110, through link 112, is urged to rotate in a clockwise direction against the tension of spring 114. When the cranks are thus rotated, the arms 104 and 106 are rotated toward one another as seen in Figure 14. When the roller 116 rises it permits rotation of the crank 108 in a clockwise direction and the rotation of crank 110 in a counterclockwise direction under the action of spring 114 and thus the fruit grasping arms 104 and 106 rotate apart from one another.

At the extremity of each of the arms 104 and 106 are provided fruit grasping claws, generally designated 118 and 120. Each of these fruit grasping claws is constructed in the same manner and only the details of claw 118 will hereinafter be described. This claw comprises a pair of spaced bars 122, 124 which are substantially parallel to one another and spaced sufficiently far apart to permit a third bar to pass in between. Thus when the first stage fruit transfer means is pivoted by crank 84 to its rearmost position, the fruit grasping arms are positioned over one of the orienting mechanisms 14 and at this time the arms 104 and 106 pivot together to that the claws 118 and 120 grasp the fruit and lift it from the fruit orienting mechanism and carry it forwardly when the crank 84 pivots the housing 44 in a counterclockwise direction. The claws 118 and 120 are caused to close upon the fruit in the following manner.

Mounted in the housing 44 is a shaft 126 which is rotatably mounted at one end in a suitable bearing 127 formed in a recess in the end of shaft 50 to accommodate shaft 126, as seen in Figure 16, and is rotatably mounted in the housing 44 by bearing 128 at the opposite extremity. Suitably secured to this shaft 126 is a crank 130. At the opposite extremity of the crank 130, a bolt 132 having a ball 134 formed thereon is mounted such as by nuts, as seen in Figure 14. The jaw control rod 136 is provided at its upper extremity 138 with an aperture adapted to fit about the ball 134 forming a ball and socket joint which is held together, in this embodiment, by suitable nuts. The opposite extremity of the jaw control rod 136 is secured to a bell-crank 140 which is pivotally mounted to the frame 40 of the fruit processing machine about shaft 142. One arm 144 of the bell-crank 140 carries a cam follower 146. This cam follower is urged against cam 148 by spring 150 which is secured to the opposite arm of the bell-crank and to the frame 40. The cam 148 is mounted about shaft 94 so that rotation of the shaft rotates cam 92 which controls the oscillation back and forth of the first stage transfer means and it also rotates cam 148 which controls the opening and closing of jaws 118 and 120, the two cams being formed so that the closing of the jaws occurs at the rearmost position of the arms 104 and 106 and the jaws open at the foremost position of the arms 104 and 106. Figure 2 illustrates the first stage transfer means in its rearmost position where the jaws are closing about a peach. In Figure 6 the first stage transfer means has been pivoted to its foremost position and is about to deliver the peach to the second stage transfer means.

In order to prevent the closing of the fruit grasping arms 104 and 106 from grasping too tightly and thereby injuring the fruit, a lost motion mechanism is provided. The jaw control rod 136 is rigidly connected to the crank 130 which in turn is connected to the shaft 126, see Figures 12 and 16. The shaft 126 passes through bearing 128 and at its opposite extremity is rotatably mounted in the flange portion of shaft 50 and in the end wall of the housing 44. Mounted on the shaft 126 is a boss 154 which is keyed or otherwise suitably secured to the shaft 126. Adjacent to the boss and floating freely on shaft 126 is a sleeve 156. This sleeve has an arm 158 which projects at substantially right angles to the sleeve 156. The arm 158 is forked at its extremity and the roller 116 is secured therebetween by means of a pin 160 which is journaled in the opposed forks of the arm. Connected in a tensioned condition between stud 162 on the boss 154 and stud 164 formed on the arm 158 is a spring 166 which is coiled about sleeve 156. The tensioned spring 166 is normally prevented from rotating the arm 158 and thus unwinding by a stop 168, best seen in Figure 16, which is mounted upon a sleeve 170 keyed to shaft 126. When the jaw operating rod 136 is pulled downwardly by the crank 140, the crank 130 is rotated in a clockwise direction, which rotates shaft 126 in a clockwise direction. This clockwise rotation of the shaft 126 is imparted to the sleeve 170 and the boss 154. Since the spring 166 is tensioned, it urges the arm 158 to rotate with the stop 168 as the stop rotates clockwise with the sleeve 170. This rotation of the arm 158 causes the roller 116 on said arm 158 to push downwardly on the contact surface of crank 108, forcing the crank 108 to rotate counterclockwise against the force of spring 114 and, as heretofore described, rotates crank 110 in a clockwise direction, thereby closing the fruit grasping jaws on the fruit. When the jaws contact the fruit, the spring 166 performs a lost motion function by allowing the rotation of the shaft 126, the boss 154 and the sleeve 170 continue to rotate while the arm 158 and roller 116 are restrained from further rotation by the interposition of the fruit between the jaws 118 and 120. Such rotation of the shaft 126, after the downward movement of the arm 158 is arrested, causes the stop 168 to leave the arm 158 and results in the further winding up of the spring 166 which increases the pressure of the jaws 118 and 120 upon the fruit so that it is held firmly but gently between said jaws.

When the cam 148 allows the crank 140 to pivot counterclockwise about shaft 142, an upward force is exerted on jaw operating rod 136 which transmits a counterclockwise rotation to the shaft 126. This counterclockwise rotation of the shaft and hence of boss 154 and sleeve 170 raises stop 168 which soon contacts arm 158, relieving the increased tension upon the spring 166. Continued counterclockwise rotation of the shaft 126 causes the stop 168 to raise the arm 158 and the roller 116, thus enabling the spring 114 to rotate the crank 110 in a counterclockwise direction which, through link 112, causes crank 108 to rotate in a clockwise direction causing the arms 104 and 106 to move apart from one another.

When the first stage of the fruit transfer means has been pivoted to a position corresponding to that illustrated in Figure 6, the second stage of the fruit transfer means is pivoted to its rearmost position in a manner hereinafter to be described and the jaws of this stage close about the fruit.

The details of the second stage of the transfer means are best illustrated in Figure 11.

A sleeve 172 is rotatably mounted on shaft 86. Projecting upwardly from the sleeve 172 are the frame members of the second stage 84 and 174. These frame members are bent at their upward extremities toward one another to form an A-shaped frame which is joined at the top by cross bar 176. Journaled in the cross bar 176 are the shafts 178 and 180. At the outer extremities of the shafts 178 and 180 fruit grasping arms 182 and 184 are suitably secured, said arms corresponding to the fruit grasping arms 104 and 106 of the first stage of the transfer means. Cranks 186 and 188 are secured to the shafts 178 and 180, respectively, and are joined at one extremity by link 190. At the extremities opposed to those joined by link 190, each crank 186 and 188 is provided with an upwardly projecting arm 192, 194, each of which is provided with a pin to which an extremity of the spring 196 is suitably secured. Thus this spring 196 tends to rotate crank 186 in a clockwise direction and the crank 188 in a counterclockwise direction which would rotate shafts 178 and 180 and hence arms 182 and 184. The tendency of the cranks 186 and 188 to rotate in these directions tends to urge the arms 182 and 184 apart.

Suitably connected to the crank 186, such as by a ball and socket joint in this embodiment, is a jaw actuating rod 198. This jaw actuating rod is connected to a lever 200 through a lost motion device 201 to be hereinafter more fully described. The lever 200 is associated, through the disabling means E, which hereinafter will be described, with a cam follower 202 (see Figure 6) which is urged by spring 204 against the cam 206. Cam 206 is rotatably mounted on shaft 86 and is swedged onto gear 208 which is also rotatably mounted upon shaft 86. Gear 208 is adapted to mesh with and be driven by gear 210 which is mounted upon shaft 28 so that rotation of the shaft 28, as previously described, drives the gear 210 and gear 208, and rotating cam 206 which controls the opening and closing of fruit engaging arms 182 and 184.

A lost motion mechanism 201 to prevent the arms 182 and 184 from closing too tightly upon the fruit is provided by a housing 218 which is journaled to receive the upper end of the rod 198. The lower extremity of the rod 198 is provided with an annular spring shoulder 219 which is normally urged to seat upon an abutment 220 by a spring 221 which is preloaded and compressed between the shoulder 219 and the inner surface of the upper end of the housing 218. Said housing 218 is suitably connected to the lever 200, such as by a ball and socket joint as illustrated in this embodiment. A downward pull on the housing 218 will normally be transmitted to the rod 198 by the compressed spring 221 without any perceptible relative motion between rod 198 and the housing 218. However, should a force resisting downward motion of rod 198 and greater than that exerted by the spring 221 be applied to the rod 198 as the housing 218 is moved downwardly by the lever 200, relative motion between the rod 198 and the housing 218 will occur resulting in further compression of the spring 221. When the arms 182 and 184 grasp a fruit, such a resistance to further closing of the arms is provided and a further downward thrust of the lever 200 and housing 218 is absorbed by the compression of spring 220.

Mounted upon shaft 94 is a gear 212 which also meshes with and is driven by gear 210. As previously described, the rotation of shaft 94 rotates the cam 92 which oscillates the first stage of the transfer means between the fruit receiving position wherein the fruit engaging arms 104 and 106 are positioned over one of the orienting mechanisms 14 and the fruit releasing position, as seen in Figure 6, where the first stage of the transfer means delivers the fruit to the fruit engaging arms 182 and 184 of the second stage. The arm 88 which is actuated by the cam 92 and shaft 94 is, as previously described, an extension of the frame member 84 of the second stage of the transfer means. Thus when the arm 88 is urged clockwise by cam 92, as seen in Figure 6, the frame 84 is pivoted about shaft 86, carrying with it the sleeve 172, frame member 174 and the remainder of the second stage of the transfer means. It is readily apparent that the rocking or oscillatory motion of both the first and second stages of the transfer means is provided by a common source, that is, through arm 88 and cam 92, and that the arc traversed by the first and second stage transfer means will be of the same length and degree due to the previously described parallelogram linkage connecting them. When the arm 88 is caused to rotate clockwise, the second stage of the transfer means is pivoted towards the impaling blades 22. When the fruit grasping arms 182 and 184 reach the point where one of the impaling blades will receive the peach, the contour of cam 206 is such that the follower 202 will be moved towards shaft 86 by the spring 204, permitting rotation of the lever 200 in a counterclockwise direction and an upward motion of the rod 198 due to the pull of the spring 196. This permits the spring 196 to rotate the arms 182 and 184 apart from one another, releasing their hold on the fruit after they have delivered a fruit to the impaling blade. At the time when the second stage of the transfer means is in this position, the first stage of the transfer means has been pivoted to the fruit receiving position, as clearly seen in Figure 2. Cam 148 actuates the fruit grasping arms 104 and 106 to close about another fruit preparatory to lifting it from the fruit orienting mechanism 14. The cam 92 then permits the movement of the cam follower 90 and the arm 88 in a counterclockwise direction which rotates the first stage of the transfer means in a counterclockwise direction toward the second stage of the transfer means. The second stage of the transfer means at the same time pivots in a counterclockwise direction until both stages are in the position seen in Figure 6. At this time the cam 206 causes lever 200 to pivot clockwise, exerting a downward force on rod 198 and causing the fruit grasping arms 182 and 184 to close about the peach and subsequently the cam 148 permits the arms 104 and 106 to relinquish their hold upon the peach. In this manner the peach is delivered by the first stage to the second stage of the transfer means.

Provided at the lower extremity of each of the arms 182 and 184 is a fruit engaging claw such as 214 and 216. These claws are of the same construction as the claws 118 and 120, being formed of bars spaced sufficiently apart from one another to permit one of the bars of the corresponding claw of the first stage of the transfer means to pass therebetween, as clearly seen in Figure 6. This insures positive transfer from the first stage to the second stage without dropping the fruit since during transfer thereof either one or both sets of jaws are gripping the fruit at all times.

The disabling means E, in this embodiment, is interposed between the lever 200 and the cam follower 202. Shaft 222 is mounted between the arms of a U-shaped bracket 224, which in turn is secured to the frame member 84 of the second stage transfer means such as by bolts, as seen in Figures 22 and 25. A sleeve 226 is rotatably mounted upon the shaft 222 and has an arm 228 formed thereon. At the extremity of the arm a roller 230 is secured, the arm 228 being journaled to receive the shaft upon which the roller is mounted. Nut 232 holds the shaft to the arm 228 and spacer 234 positions the roller with respect to the arm 228. A sleeve 236 is supported by shaft 222 adjacent the sleeve 226. The roller 230 is positioned with respect to the shaft 222 so that it will overlie a portion of the sleeve 236. Arms 238 and 240 are formed on the sleeve 236, which are spaced apart and parallel to one another. A curved latch member 242 is pivotally mounted between the arms 238 and 240 by means of pin 244. The outer extremity of this latch member 242 is curved, as best seen in Figure 22, so that it will fit about the the roller 230 when in the latched position. The spring 204 is connected at one extremity to pin 248 formed on the latch member 242 and at the opposite extremity about pin 250 formed on frame member 84. The spring functions to urge the rounded extremity of latch member 242 into contact with the roller 230, thus latching the sleeves 226 and 236 together so that they rotate on shaft 222 as a single unit. An arm 252 is formed on sleeve 236 which, at its outer extremity, is journaled to receive a shaft upon which the cam follower 202 is mounted, the shaft being retained to the arm 252 by a suitable nut. The spring 204, when the latch 242 fits about the roller 230, also functions to urge the cam follower 202 against the cam 206.

The latch member 242 is provided, adjacent the extremity opposed to the curved latching extremity, with a recessed portion 254 into which a pin 256 is adapted to fit. The pin 256 is carried by the disabling bar 258 which in turn is pivotally mounted about pin 259 to a plate 260 which in turn is secured to the upper U-shaped longitudinal frame member 262 of the fruit orienting machine A as by bolts as seen in Figure 21.

Mounted on the frame member 262 is a solenoid, generally designated 264. The solenoid is connected to the upper extremity of the disabling bar 258 through link 266 and bar 268 (see Figure 21). A spring 270 is secured at one extremity to the disabling bar 258 and at the opposite extremity to the frame of the fruit orienting machine. The spring functions to rotate the disabling bar 258 clockwise about pin 259, withdrawing the pin 256 from the arc of travel of the latch member 242 as the second stage of the transfer means B is pivoted from the fruit receiving to the fruit releasing position.

When the solenoid is energized, as hereinafter will be described, the bar 268 is drawn to the left, as seen in Figure 21, and this motion, through link 266, pivots the disabling bar 258 counerclockwise about pin 259 until pin 256 is projected into the path of travel of the latch member 242. When, due to the clockwise rotation of the arm 84, the recess 254 of the latch member 242 strikes the pin 256 further movement of the latch 242 is prevented and additional clockwise movement of said arm 84 will pivot the latch about pin 244 so that the roller 230 is drawn free from the curved latching portion of the latch member 242. When the roller 230 of the arm 228 is disengaged from the latch 242, further rotation of the sleeve 236 is imparted to the latch member 242 but is not transmitted to the roller 230. Thus the sleeve 226 does not rotate and the lever 200 is no longer urged in a clockwise direction. Thus no further downward force is exerted on the operating rod 198 and the spring 196 functions to draw arms 192 and 194 towards one another, pivoting the fruit engaging arms 182 and 184 away from one another; these arms releasing their hold upon the peach and dropping it either on the floor or into a suitable receptacle. Thus the peach is not transmitted by the second stage of the transfer means to the impaling blades 22.

The solenoid 264 is actuated by the fruit inspecting device D in a manner which will hereinafter be described, and is energized only for a sufficient length of time to permit the pin 256 to trip the latch 242. The solenoid is then de-energized, and spring 270 rotates the disabling bar 258 in a clockwise direction, withdrawing the pin 256 from the recess 254 and the latch member 242. The spring 204 then urges latch member 242 back toward the engaging position wherein the latch member's curved extremity engages the roller 230 when the cam 206 has permitted the arm 252 to rotate counterclockwise into a roller engaging position, thus when the second stage of the transfer means again approaches the fruit grasping position, as seen in Figure 6, it is once again ready to receive a fruit from the first stage of the transfer means.

The fruit inspecting device is actuated by a cam 272 which is formed on the shaft 94 (see Figure 6). A bell crank 274 is mounted upon bearing 276 (see Figure 14) which is journaled to receive the bell crank. The bearing is mounted upon pin 278, which in turn is supported by boss 280 which projects into a suitable aperture in frame 40. The arm 282 (see Figure 6) of bell crank 274 supports a cam follower 284 so that rotation of the cam 272 will cause the bell crank to pivot about pin 278. The other arm 286 of the bell crank projects into the clevis 288 and is secured there by pin 290. Extending upwardly from the clevis 288 and attached thereto is an inspecting device operating rod 294. Said inspecting device operating rod 294 is loosely held in a guideway 296 and extends through a spring bracket 298. The guideway 296 and spring bracket 298 are provided with suitable apertures through which the rod 294 projects so that it is free to move vertically. Mounted loosely on the lower extremity of the operating rod 294 and adapted to bear against the top of clevis 288 is a spring retaining plate 300. A compression spring 302 is retained between the spring bracket 298 and the spring retaining plate 300. This spring tends to move the operating rod 294 and the attached clevis 288 to their lower positions (see Figure 6) and thus functions to urge bell crank 274 in a counterclockwise direction so that the cam follower 284 yieldably bears against cam 272. Thus the cam is formed so that at the desired time it will force the cam follower downwardly, rotating bell crank 274 in a clockwise direction, overcoming the force of spring 302 and moving the operating rod 294 vertically upward.

Secured to the operating rod 294, by suitable means such as clamps 304 and 306 in this embodiment, is the inspecting device switch housing 308 which is moved vertically by the movement of the operating rod 294. Extending from the housing 308 is a hollow tubular extension 310 to which circular plate 312 is affixed such as by clamp 314. The plate 312 is provided with a centrally located aperture 315 through which at least one and preferably a plurality of prongs 316 project. In this embodiment, as seen in Figures 2 and 18, three such prongs are utilized mounted on the extremity of the prong carrying bar 318. The prong carrying bar 318 is rigidly secured to one arm of the switch tripping crank 320, which is pivotally mounted in the housing 308 about pin 322. The switch tripping crank 320 has its other arm 324 provided with a suitable aperture through which the spring carrying pin 326 may project. A spring 328 has one extremity connected to pin 326 and the other extremity connected to a pin 330 which projects through a suitable aperture in the housing 308. The spring 328 tends to rotate the crank 320 counterclockwise about pin 322 which urges the prongs 316 upwardly into the aperture 315 of the plate 312. When the inspecting device is raised upwardly through the upward movement of the operating rod 294, the pins 316 are projecting through the plate 312. The inspecting device is mounted to the frame of the fruit processing machine C so that the pins 316 will be located at the position where the fruit is transferred from the first stage of the transfer means. While the fruit is in this inspecting position, the cam 272 causes the bell crank 274 to rotate clockwise, raising the rod 294 and the inspecting device upwardly until the prongs 316 engage the fruit.

Referring now to Figures 4 and 5, when the prongs 316 strike a misaligned fruit, as indicated in Figure 5, the prongs project into the flesh of the fruit and meet little or no resistance sufficient to overcome the strength of spring 328. When, however, the fruit is properly aligned (as seen in Figure 4) at least one of the prongs 316 will strike the pit 332 of the fruit and such resistance will cause the bar 318 to rotate in a clockwise direction about a pivot point formed by pin 322, overcoming the force exerted by spring 328 and rotating the crank 320 in a clockwise direction for a purpose hereinafter to be described. It is desirable to utilize several prongs 316 for this probing operation to insure contact with the pit 332.

A contact point 334, forming one-half of the inspecting switch, generally designated 336, is formed on the insulated support member 338 which is secured to the housing 308, such as by screws in this embodiment. The upper contact point 340 is mounted upon leaf spring 342. The leaf spring 342 is secured by any convenient means (not shown) at its rear extremity to the spring carrying bracket 344 and suitably insulated. The bracket 344 is also adapted to receive and secure a second leaf spring 346. The switch tripping bar 348 of insulated material is secured to the end of the leaf spring 346. Thus when the crank 320 is rotated in a clockwise direction, that is when prongs 316 indicate the peach is properly aligned, it carries the tripping bar 348 in a clockwise direction against the leaf spring 342. The tripping bar 348 strikes the leaf spring 342 carrying it upwardly so that the contact between the contacting points 340 and 334 is broken, opening the switch 336 for a purpose hereinafter to be described.

The housing 308 is pivotally connected about pin 350 to the clamp 306, as seen in Figure 17, so that the prongs 316, when they meet the pit 332 of the fruit, will not exert sufficient force against the fruit to cause it to move upwardly. After the bar 318 has pivoted about the pin 322, further resistance will cause the inspecting device housing 308 to pivot about pin 350. Mounted upon the housing is a connecting bar 352 to which a spring 354 is attached. The opposite extremity of the spring 354 is secured to an arm 356 formed on clamp 304. Thus the spring 354 urges the housing 308 to rotate in a counterclockwise direction until the tubular extension 310 is substantially at right angles with the operating rod 294. Thus when the housing 308 is caused to rotate in a clockwise direction, the resistance of spring 354 must be overcome. When the prongs 316 no longer contact the pit of the fruit, which is when the cam 272 permits the crank 274 to rotate in a counterclockwise direction, lowering the operating rod 294 and the fruit inspecting device D, the spring 354 urges the housing 308 to rotate in a counterclockwise direction. A second arm 358 (see Figure 18) is formed on the clamp 304 which has suitably secured thereto a stop member 360. The stop member 360 abuts against a shock mount 362, which in turn is mounted upon the suitable bracket 364, which bracket is attached to the housing 308. The shock mount 362 may be of any suitable type well known to those skilled in the art and is adapted to prevent jarring of the fruit inspecting device D when the stop member abuts against the stop or shock mount 362.

Figure 15:
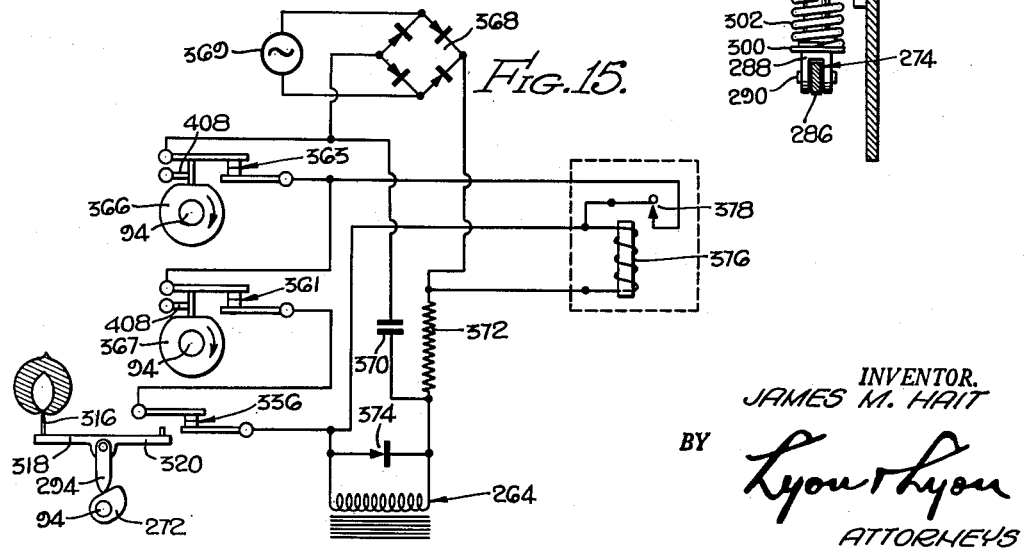
Figure 15 is a schematic wiring diagram, including a diagrammatic view of the switch actuating mechanisms.

When the fruit is properly aligned, as seen in Figure 4, the inspecting switch 336 (see Figure 15) is opened so that the solenoid 264 is not energized through the circuit illustrated in Figure 15. When the fruit is in a misaligned position, such as seen in Figure 5, the inspecting switch 336 remains closed, which permits energizing of the circuit seen in Figure 15 and consequently of the solenoid 264 which actuates the disabling bar 258, as previously described, swinging the pin 256 into the recessed portion 254 of the latch 242, thus tripping the latch so that no downward force is exerted upon the rod 198. Thus the spring 196 rotates the fruit grasping arms 182 and 184 away from one another, as hereinbefore described, releasing the hold of the second stage of the transfer means upon the fruit and dropping it into a suitable receptacle.

The electrical circuit responsive to the inspecting device and used to energize solenoid 264 is shown in diagrammatic form in Figure 15, structural features being shown in Figures 7, 8 and 17. Briefly the operation of this circuit is as follows. So long as the peach is properly aligned, as shown in Figure 4, the prong 316 (Figures 4 and 15) engages the pit 332 to cause the switch 336 to open. Under this particular condition the solenoid 264 is prevented from being energized and the peach is transferred to the impaling blades 22. However under the condition shown in Figure 5 when the path of prong travel is unobstructed by the peach pit 332, the switch 336 remains closed and in such case the solenoid 264 is energized to thereby cause disabling of the second stage of the peach transfer means, i. e., to cause the second stage of the transfer means to release its hold on the peach, whereupon the peach drops into a suitable receptacle for the rejected peaches. It is noted that the solenoid 264 is serially connected through switches 336, 361 and 363 with the output terminals of the full wave rectifier 368, the input terminals of which are supplied with current from the alternating current force 369. It is thus necessary that each of the switches 336, 361 and 363 be closed before the solenoid 264 is energized. The serially connected resistance 372 and shunt connected condenser 370 serve as filtering elements. The switches 363 and 361 are operated in timed relationship upon the rotation of the shaft 94 by the switch actuating cams 366 and 367, respectively, adjustably mounted upon said shaft 94. As previously mentioned, the inspecting device operating cam 272 is also mounted upon shaft 94 whereby the actuation of the switches 361 and 363 is timed with respect to the operation of the fruit inspection device D. The switches 361 and 363 are normally open and are closed upon rotation of the shaft 94 for a relatively short time and the switch 336 is normally closed, being open only when the prongs 316 strike the pit of a properly aligned fruit. Upon rotation of the shaft 94 first the so-called hold switch 363 closes, then the time switch 361 closes to condition the circuit for operation by the inspecting switch 336. Subsequently, first the time switch opens, then the hold switch opens. The time switch 361 remains closed for a relatively short period of time coincident with the effective period of operation of the switch 336 and for that purpose to secure such coincidence the cam 367 is adjustably mounted on the shaft 94, as will hereinafter be described. In order that the serial circuit for the solenoid 264 remain closed after the time switch 361 is opened, a holding circuit which includes the relay 376 with its associated normally open switch 378 is provided. It is noted that one terminal of the relay winding 376 is connected directly to one of the output terminals of the full wave rectifier 368, while the other terminal of the relay winding is connected to the other terminal of such rectifier through the switches 336, 361 and 363. In other words the relay 376 is energized only when the solenoid 264 is energized and when such relay is energized the switch 378 is closed to short circuit the switches 336, 361, thereby allowing current to continue to flow through the solenoid 264 to complete the rejecting operation even though either one of the switches 336 or 361 may in the meantime open. Subsequently, the relay 376 is de-energized when the switch 363 is opened.

As mentioned before, the cam 367 is adjustably mounted on the shaft 94 to secure coincidence of the rise of the inspecting device D actuated by the cam 272 and the closing of the switch 361. The cam 366 for actuating the hold switch 363 is similarly adjustable on the shaft 94 for timing the closing of the switch 363 with the rise of the inspecting device D. Said cam 366 is so shaped that it closes the hold switch 363 for a relatively long interval during which the solenoid 264 remains energized, the initial energization of said solenoid 264 being caused by the closing of switches 361 and 363 and the maintenance of the switch 336 in its normally closed position due to the failure of the prongs 316 to strike the pit of a misaligned fruit. It is noted that the rectifier 374 connected in shunt with the solenoid 264 is for the purpose of suppressing transients.

The time cam 367 and the hold cam 366 are each provided with a centrally located aperture through which the bolt 380 (see Figure 8) may project. A spacing sleeve 382 is provided with a centrally located aperture which is adapted to be inserted upon bolt 380 between the cams 366 and 367. A second spacing sleeve 384 is positioned on the bolt 380 between the time cam 367 and the extremity of shaft 94. The shaft 94 is provided with a centrally located threaded recess 386 into which the bolt 380 may be screwed. Thus it is apparent by loosening the bolt 380, cams 366 and 367 may be adjusted both with respect to each other and with respect to the shaft 94 and when bolt 380 is tightened the cams are rigidly retained in their adjusted positions. In this embodiment the frame 40 of the peach processing machine C is provided with an aperture through which the shaft 94 projects. A bracket 388 is suitably secured to frame 40 and is provided with an aperture through which the shaft 94 may project so that the cams 366 and 367 are retained on the shaft 94 outside the frame of the peach processing machine to permit access to these cams for adjustment so that the timing and holding switches close at the proper time. The bracket 388 is provided with legs 390 and 392 upon which the insulating plate 394 is mounted. A second insulating plate 396 is suitably secured to the first insulating plate and has mounted thereon the time switch 361 and the hold switch 363. The time and hold switches are identical in construction and are operated in the same fashion by their respective cams so that only the time switch will be described in detail.

In this switch one of the contact points 398 is mounted upon an insulated supporting plate 400, which in turn is secured such as by screws to the insulating plate 396. The other contact point 402 is mounted upon a leaf spring 404. The leaf spring 404 is secured by any convenient means (not shown) at its rear extremity to a bracket 406, said spring 404 being insulated from said bracket by means not shown. The leaf spring 404 tends to retain the contact point 402 in contact with point 398.

A switch breaker 408 of insulated material is secured upon leaf spring 410 which is secured to the bracket 406 in the same manner as leaf spring 404. The leaf spring 410 tends to hold the switch breaker 408 out of contact with the leaf spring 404. The timing cam 367 is provided with a flattened area thereon, see Figures 9 and 7. When the shaft 94 is rotated so that this flattened surface is opposite the switch breaker 408, the timing switch 361 is closed. When, however, the shaft 94 is rotated so that the circular portion of the cam 367 is adjacent to the switch 361 the switch breaker 408 rides on the cam and is forced into contact with the leaf spring 404 and moves the contact 402 away from contact 398, thereby opening the timing switch. The construction and function of the hold switch is identical to that of the time switch. However the flattened area on the hold cam covers a greater area of the surface of the cam, as clearly seen in Figure 7, so that the hold switch is closed for a longer period of time than the time switch, for a purpose hereinbefore described.

The operation of this invention is as follows. Fruit is fed from a hopper 10 to the orienting mechanism 14. In this embodiment the orienting mechanism is of the type having rotating conical rollers and a finder which projects between the conical rollers and locates the calyx indent of the fruit. The orienting mechanism 14 is carried by the endless chains to the point seen in Figure 2 wherein the first stage of the transfer means is pivoted to its rearmost or fruit receiving position. The fruit grasping arms 104 and 106 close about the fruit, lifting it from the orienting mechanism 14. The first stage of the transfer means then delivers the fruit to the inspecting position, as seen in Figure 6, where the fruit is directly over the inspecting device D. When the fruit is so located the second stage of the transfer means is pivoted to the fruit inspecting position wherein the bars on the claws of the fruit grasping arms are interlaced as seen in Figures 3 and 6 and the fruit is transferred from the first stage to the second stage of the transfer means. While the fruit is held by both pairs of claws the fruit inspecting device D is actuated to move vertically until the prongs 316 probe the fruit to ascertain whether or not it is properly aligned. If the fruit is properly aligned, the inspecting switch 336 is opened. If the fruit is improperly aligned the inspecting switch 336 remains closed. The time cam 367 and the hold cam 366 have rotated to a position wherein the time switch and the hold switch are permitted to close. In the event that the fruit is misaligned, the switches 361 and 363 are simultaneously closed, the switch 336 remains closed, and the solenoid 264 is energized to actuate the disabling means. The disabling bar 258 is rotated by the solenoid swinging the pin 256 into the path of the recess 254 of latch member 242. As the second stage of the transfer means pivots from its fruit receiving position seen in Figure 6 towards the position where the second stage of the transfer means delivers the fruit to an impaling blade 22, the pin 256 engages the recess 254, tripping latch member 242 and terminating the downward force upon the operating rod 198. This permits the spring 196 to cause the fruit grasping arms 182 and 184 to move apart, releasing the hold on the fruit.

While what hereinbefore has been described is a preferred embodiment of this invention, it is readily apparent that many changes and modifications can be resorted to without departing from the scope of this invention or of the appended claims.

I claim:

1. In a fruit orienting device, the combination of a conveyer, a fruit orienting and supporting member carried by said conveyer and upon which a fruit is carried during orientation, a second conveyer driven in timed relation to said first conveyer, means for transferring fruit from said orienting member to an inspecting station positioned between said first and second mentioned conveyers, means at said inspecting station for determining alignment of said fruit, means for transferring fruit from said inspecting station to said last mentioned conveyer, and means responsive to said inspecting means for interrupting transfer to said last mentioned conveyer when the fruit is improperly aligned for transfer.

2. In a fruit orienting device, the combination of a conveyer, a fruit orienting and supporting member carried by said conveyer and upon which a fruit is carried during orientation, a second conveyer driven in timed relation to said first conveyer, means for transferring fruit from said orienting member to an inspecting station, means at said inspecting station for determining alignment of said fruit, means for transferring fruit from said inspecting station to said last mentioned conveyer, a cam driven in timed relation to said first conveyer, means responsive to said cam actuating said last mentioned transfer means to convey fruit to said second conveyer, and means responsive to said inspecting means to disable said cam responsive means when a fruit is improperly aligned for transfer.

3. In a fruit orienting device, the combination of a continuously moving conveyer, a fruit orienting and supporting member carried by said conveyer and upon which a fruit is carried during orientation, a second continuously moving conveyer driven in timed relation to said first conveyer, means for transferring fruit from said orienting member to an inspecting station, means at said inspecting station for determining alignment of said fruit, means for transferring fruit from said inspecting station to said last mentioned conveyer, a cam driven in timed relation to said first conveyer, cam responsive means actuating said last mentioned transfer means to convey fruit to said second conveyer, said cam responsive means including latch means, and means tripping said latch means disabling said last mentioned transfer means responsive to said inspecting means when a fruit is indicated as improperly aligned for transfer by said inspecting means.

4. In a fruit orienting device, the combination of a continuously moving conveyer, fruit orienting and supporting members carried by said conveyer and upon which fruit is carried during orientation, a second continuously moving conveyer driven in timed relation to said first conveyer, means for transferring fruit from said orienting members to an inspecting station between said first and second mentioned conveyer, fruit probing means at said inspecting station to inspect orientation of said fruit, means for transferring fruit from said inspecting station to said last mentioned conveyer, and means responsive to said fruit probing means for disabling said last mentioned transfer means when the fruit is improperly oriented for transfer.

5. In a fruit orienting device, the combination of a continuously moving conveyer, fruit orienting and supporting members carried by said conveyer and upon which fruit is carried during orientation, a second continuously moving conveyer driven in timed relation to said first conveyer, means for transferring fruit from said orienting members to an inspecting station between said first and second mentioned conveyer, means at said inspecting station for probing a fruit and locating the pit thereof, means for transferring fruit from said inspecting station to said last mentioned conveyer, and means for disabling said last mentioned transfer means when said probing means fails to locate the pit of a fruit.

6. In a fruit orienting device, the combination of a continuously moving conveyer, fruit orienting and supporting members carried by said conveyer and upon which fruit is carried during orientation, a second continuously moving conveyer driven in timed relation to said first conveyer, means for transferring fruit from said orienting members to an inspecting station between said first and second mentioned conveyer, fruit probing means at said inspecting station adapted to locate the pit of a fruit, means driven in timed relation to said first mentioned conveyer to vertically raise said probing means when a fruit is at said inspecting station, means for transferring fruit from said inspecting station to said last mentioned conveyer, and means for disabling said last mentioned transfer means when said probing means fails to locate the pit of a fruit.

7. A device for determining the orientation of a drupe fruit comprising the combination of means for piercing the epicarp of the fruit to engage the endocarp thereof without displacing same, and means operably connected to said first mentioned means for indicating when said piercing means fails to strike the endocarp of an improperly oriented fruit.

8. A device for determining the orientation of a drupe fruit comprising the combination of means adapted to pierce the epicarp of a fruit to engage the endocarp thereof without displacing same, means operably connected to said first mentioned means for moving said piercing means into contact with a fruit, and means for indicating when said piercing means fails to strike the endocarp of an improperly oriented fruit.

9. A device for determining the orientation of a drupe fruit comprising the combination of a prong carrying bar, at least one prong carried at one extremity of said bar and adapted to pierce the epicarp of a fruit, means for moving said bar with relation to a fruit so that said prong will pierce said fruit, and indicating means operably connected to the other extremity of said bar and actuated thereby when said prong fails to strike the endocarp of a fruit.

10. A device for determining the orientation of a drupe fruit comprising the combination of a prong carrying bar, at least one prong carried at one extremity of said bar and adapted to pierce the epicarp of a fruit, means for moving said bar with relation to a fruit so that said prongs will pierce said fruit, and a switch adjacent the other end of said bar, said last mentioned end of said bar actuating said switch when said prongs strike the endocarp of a fruit.

11. A device for determining the orientation of a drupe fruit comprising the combination of a housing, a prong carrying bar pivotally mounted in said housing so that one extremity thereof projects from said housing, at least one prong carried by the above mentioned extremity of said bar adapted to pierce the epicarp of a fruit, a switch adjacent the extremity of said bar disposed inside said housing, and means for moving said housing with relation to a fruit so that said prongs will pierce said fruit, said bar being pivoted when said prongs strike the endocarp of the fruit causing the extremity of the bar retained in the housing to actuate said switch.

12. In a fruit orienting and processing machine of the type having an inspecting station interposed between the orienting and processing of a drupe fruit, the combination of a housing vertically adjustable within the frame of said machine, a carrying bar pivotally mounted in said housing so that one extremity thereof projects from said housing, at least one fruit piercing member carried by the above mentioned extremity of said bar, means for vertically adjusting said housing so that said piercing members will puncture the epicarp of a fruit while said fruit is at said inspecting station, and indicating means adjacent the extremity of said carrying bar retained in said housing and actuated thereby to indicate proper orientation of a fruit when said piercing members strike the endocarp of a fruit.

13. In a fruit orienting and processing machine of the type having an inspecting station interposed between the orienting and processing of a drupe fruit, the combination of a housing pivotally mounted and vertically adjustable with the frame of said machine, a carrying bar pivotally mounted in said housing so that one extremity thereof projects from said housing, at least one fruit piercing member carried by the above mentioned extremity of said bar, means for vertically adjusting said housing so that said piercing members will puncture the epicarp of a fruit while said fruit is at said inspecting station, and indicating means adjacent the extremity of said carrying bar retained in said housing and actuated thereby to indicate proper orientation of a fruit when said piercing members strike the endocarp of a fruit.

14. In a fruit orienting device, the combination of a continuously moving conveyer, fruit orienting and supporting members carried by said conveyer and upon which fruit is carried during orientation, a second continuously moving conveyer driven in timed relation to said first conveyer, means for transferring fruit from said orienting members to an inspection station between said first and second mentioned conveyer, a housing pivotally mounted and vertically adjustable within the frame of one of said conveyers, a carrying bar pivotally mounted within said housing with one extremity projecting therefrom, fruit piercing members carried by the above mentioned extremity of said carrying bar, means for vertically adjusting said housing when a fruit is at the inspecting station so that said piercing members puncture the epicarp of said fruit to determine the alignment of said fruit, means for transferring fruit from said inspection station to said last mentioned conveyer, indicating means responsive to pivotal movement of said carrying means when said fruit piercing members strike the endocarp of said fruit, and means for disabling said second transfer means when said indicating means indicates that the fruit is improperly aligned.

References Cited in the file of this patent

UNITED STATES PATENTS

| | | |
|---|---|---|
| 1,416,585 | Stables | May 16, 1922 |
| 2,205,397 | Drake | June 25, 1940 |
| 2,232,210 | Carroll | Feb. 18, 1941 |
| 2,298,613 | Carroll et al. | Oct. 13, 1942 |
| 2,568,947 | Carroll | Sept. 25, 1951 |
| 2,609,913 | Doering et al. | Sept. 9, 1952 |
| 2,649,880 | Ewald et al. | Aug. 25, 1953 |